(12) United States Patent
Arvedi

(10) Patent No.: US 8,257,647 B2
(45) Date of Patent: Sep. 4, 2012

(54) STRIP OF HOT ROLLED MICRO-ALLOYED STEEL FOR OBTAINING FINISHED PIECES BY COLD PRESSING AND SHEARING

(75) Inventor: Giovanni Arvedi, Cremona (IT)

(73) Assignee: Giovanni Arvedi, Cremona (IT)

( * ) Notice: Subject to any disclaimer, the term of this patent is extended or adjusted under 35 U.S.C. 154(b) by 219 days.

(21) Appl. No.: 12/161,680

(22) PCT Filed: Jan. 26, 2006

(86) PCT No.: PCT/IT2006/000044
§ 371 (c)(1),
(2), (4) Date: Jul. 21, 2008

(87) PCT Pub. No.: WO2007/086086
PCT Pub. Date: Aug. 2, 2007

(65) Prior Publication Data
US 2010/0239452 A1  Sep. 23, 2010

(51) Int. Cl.
*C22C 38/42* (2006.01)
(52) U.S. Cl. .......................... 420/126; 420/127; 148/328
(58) Field of Classification Search .................. 420/126, 420/127; 148/328
See application file for complete search history.

(56) References Cited

U.S. PATENT DOCUMENTS

| | | | |
|---|---|---|---|
| 6,027,587 A * | 2/2000 | Hodgson et al. | 148/654 |
| 6,488,790 B1 | 12/2002 | Hartman et al. | |
| 6,669,789 B1 | 12/2003 | Edelman et al. | |
| 7,220,325 B2 * | 5/2007 | Bai et al. | 148/328 |

FOREIGN PATENT DOCUMENTS

| | | |
|---|---|---|
| EP | 1 008 667 | 6/2000 |
| EP | 1 319 726 | 6/2003 |
| EP | 1 662 012 | 5/2006 |
| JP | 58136719 A * | 8/1983 |
| JP | 2003 253 381 | 9/2003 |
| JP | 2003/087414 | 10/2003 |
| WO | 2004/026497 | 4/2004 |
| WO | 2004/031420 | 4/2004 |

OTHER PUBLICATIONS

NPL-1: ASTM E112 standard—Table 4 of E112-96: Grain Size Relationship, 1 page, (2004).*
PCT International Search Report for PCT/IT2006/000044 filed on Jan. 26, 2006 in the name of Giovanni Arvedi.
PCT Written Opinion issued for PCT Application No. PCT/IT2006/000044 filed on Jan. 26, 2006 filed in the name of Giovanni Arvedi.

* cited by examiner

*Primary Examiner* — Jie Yang
(74) *Attorney, Agent, or Firm* — Steinfl & Bruno, LLP

(57) ABSTRACT

A micro-alloyed low carbon steel strip is obtained by hot rolling at temperature of the pre-strip never lower than 900° C. and shows such metallurgical and geometrical features, as well as relating to planarity and deformability, to render the same suitable to obtain structures of low weight and good mechanical resistance, thus being able for use in replacement of cold rolled strips for the production of finished stamped or cut pieces. Said steel strip, having thickness>0.7 mm, has a ratio yield load/breaking load>70%, a fine grain structure better than grade 10 of ASTM E 112 standard in a percentage higher than 90% of the whole structure and a ratio between breaking limit under strain and yield point σ/RPo.2>90%.

6 Claims, 2 Drawing Sheets

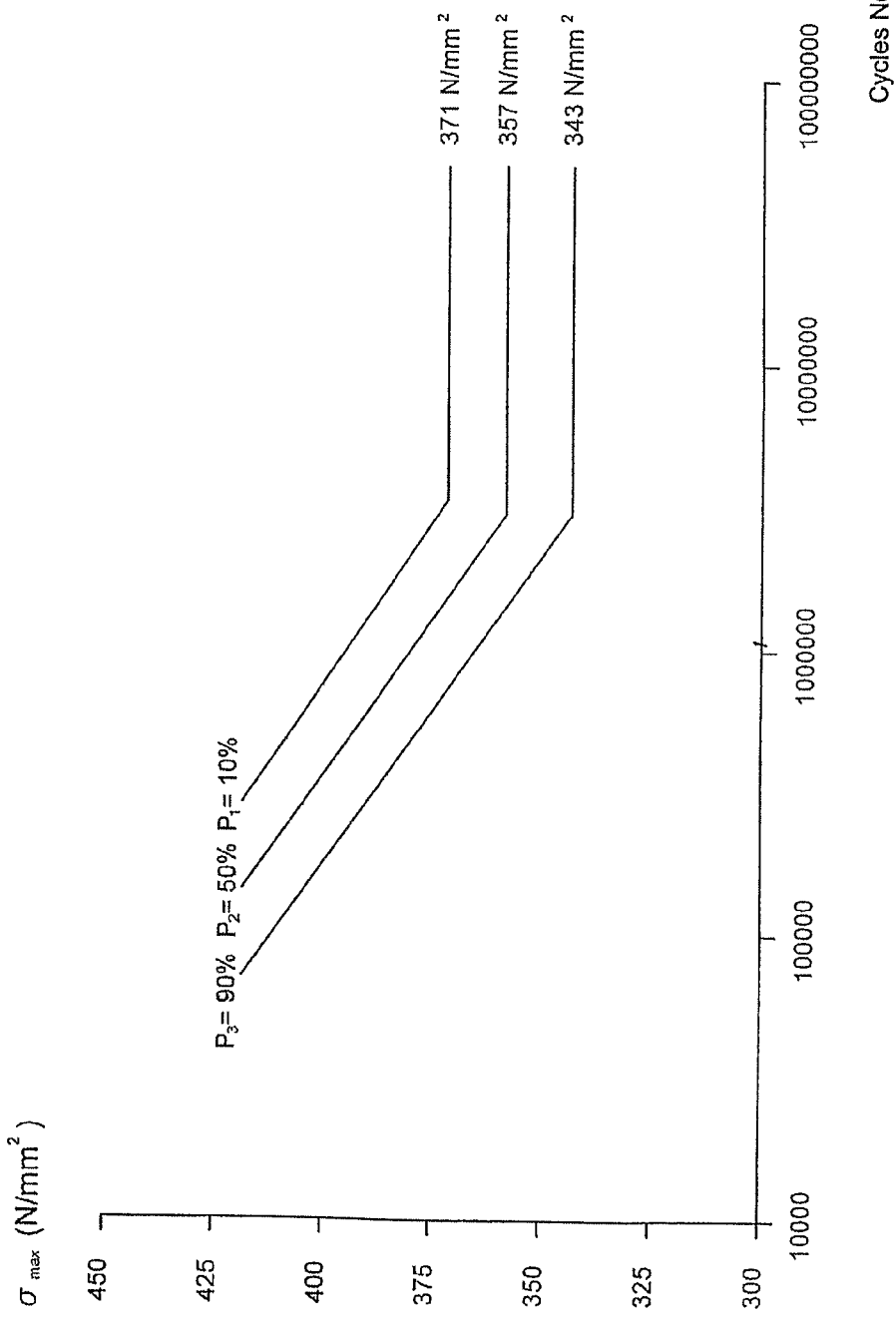

STRIP OF HOT ROLLED MICRO-ALLOYED STEEL FOR OBTAINING FINISHED PIECES BY COLD PRESSING AND SHEARING

CROSS REFERENCE TO RELATED APPLICATIONS

The present application is the US national stage of International Application PCT/IT2006/000044 filed on Jan. 26, 2006.

The present invention relates to a low carbon micro-alloyed steel strip that shows such features that it can replace, in producing finished pieces being stamped or cut, the cold rolled strips till now used to obtain structures of reduced weight and good mechanical strength.

From JP2003253381, WO03/087414, U.S. Pat. No. 6,488,790 are for example known methods for producing hot rolled micro-alloyed strips.

Said micro-alloyed or HSLA "High Strength Low Alloy" steels owe their name to the fact of including an addition of small quantities of niobium, vanadium, titanium and boron which hardly exceed the total quantity of 0.2%. These elements, instead of entering as alloying agents in the iron crystal lattice, carry out their action being combined with carbon and nitrogen in the matrix, thus forming finely dispersed carbides, nitrides and carbonitrides. These compounds contribute to the grain refining and cause the matrix hardening with their precipitation in the ferritic grains.

It is also known that these steels are particularly used in those applications where it is required to reduce the weight of a structure to be obtained without negatively affecting its mechanical strength. Their peculiar characteristic is that of showing a value of yield point which nearers the breaking load one, with a ratio between the two values that is higher than 70%. Consequently it is possible to obtain these results by reducing the stress resisting cross-section, while on the contrary, due to the proximity of the yield and breaking loads, the material is provided with high elasticity features, being subject to a strong elastic recovery causing the finished piece to assume, upon pressing, undesired configurations. Therefore the use is restricted to those cases which do not require too strict tolerances of the finished pieces.

Object of the present invention is that of providing a strip of hot rolled, micro-alloyed low carbon steel with thickness$\geq$0.7 mm which, particularly upon pickling and skin-passing, shows substantially the same metallurgical and geometrical features, as well as relating to planarity and deformability, of a cold rolled strip for producing stamped or sheared finished pieces, such as to be used as a valid substitute thereof.

The strip according to the present invention is preferably, although not exclusively, manufactured with in-line plants of the thin-slab type, as disclosed e.g. in WO2004/026497 in the name of the present applicant, which is schematically represented in FIG. 1 and is characterized, as set forth in claim 1, by a grain fineness better than grade 10 of ASTM E 112 standard in a percentage>90% of the whole structure, with a ratio between yield point and breaking load$\geq$70%.

Objects, advantages and features of the micro-alloys steel strip according to the present invention will appear more clearly from the following description with reference to the annexed drawings wherein:

FIG. 1 schematically shows a thin slab casting and in-line rolling plant, particularly suitable to the production of micro-alloyed steel strips according to the invention;

FIG. 3 shows a diagram representing the trend of strain limit of a steel according to the invention with warranted yield load of 355 N/mm$^2$.

Figure 1:
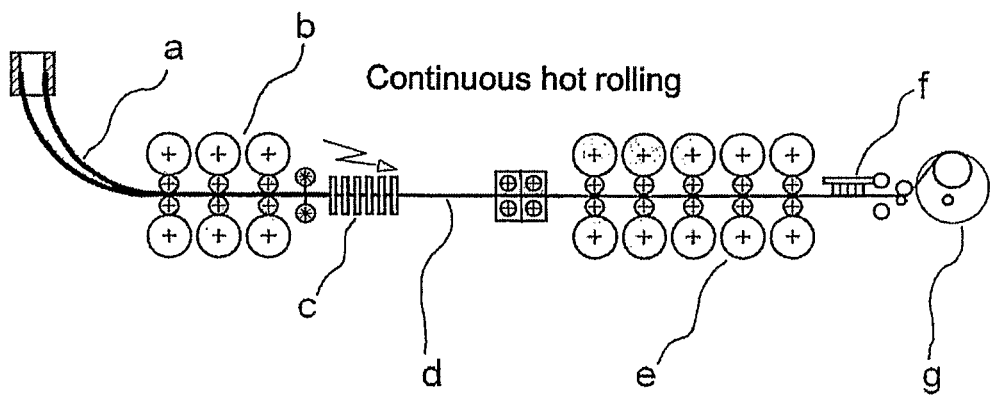

As stated above, the strip of micro-alloyed steel according to the present invention is preferably, although not exclusively, produced in thin-slab plants as schematically represented in FIG. 1, where references is made in particular to the plant being the object of the international publication WO2004/026497. The following operating steps can be observed, downstream of the casting step: a) liquid core reduction; b) roughing step directly adjoining the continuous casting; c) heating in an induction furnace; e) finishing rolling; f) compact controlled cooling; g) coiling on a reel. Such a plant is able to keep the temperature of the pre-strip (d) above 900° C. in the steps preceding the final rolling. The pre-strip rolling above preceding 900° C. allows to keep solute in the $\gamma$ iron (austenitic phase) most of the micro-alloying agents by completely exploiting their function of limiting the growth of the austenitic grain and enhancing the hardening by precipitation in ferritic phase during the cooling step after the final rolling.

It should be noted that these aspects are commonly disregarded in the traditional processes where the slab coming from continuous casting is cooled and subsequently heated for the final rolling. Therefore the action of the micro-alloying agents results strongly reduced because, while cooling, these precipitate roughly and without control, thus reducing the desired effect of a fine and diffused precipitation. This condition cannot be restored even through a subsequent heating of the slabs, unless high solubilization temperatures (beyond 1200° C.) are reached, which however lead to other negative consequences such as the grain growing and the surface decarburization of the strip with consequent worsening of their qualities. Consequently the production of HSLA, especially of thickness <2 mm, with the traditional system can only be performed through more complex and cumbersome processing cycles because, after the hot rolling, the strips have to be cold rolled and treated in an annealing line provided with a controlled cooling.

The micro-alloyed steel strip according to the present invention shows a ratio between yield and breaking load equal or higher than 70%, as well as a good capability of being formed and cut under cold conditions. These features are due to the favourable microstructural status rendering this product able to allow a valid alternative to the cold rolled micro-alloyed steel strips of equal thickness, with the additional advantage of being obtained with less addition of micro-alloying and alloying elements such as niobium, vanadium, titanium, manganese and chromium, as shown in Table 1.

Figure 2:
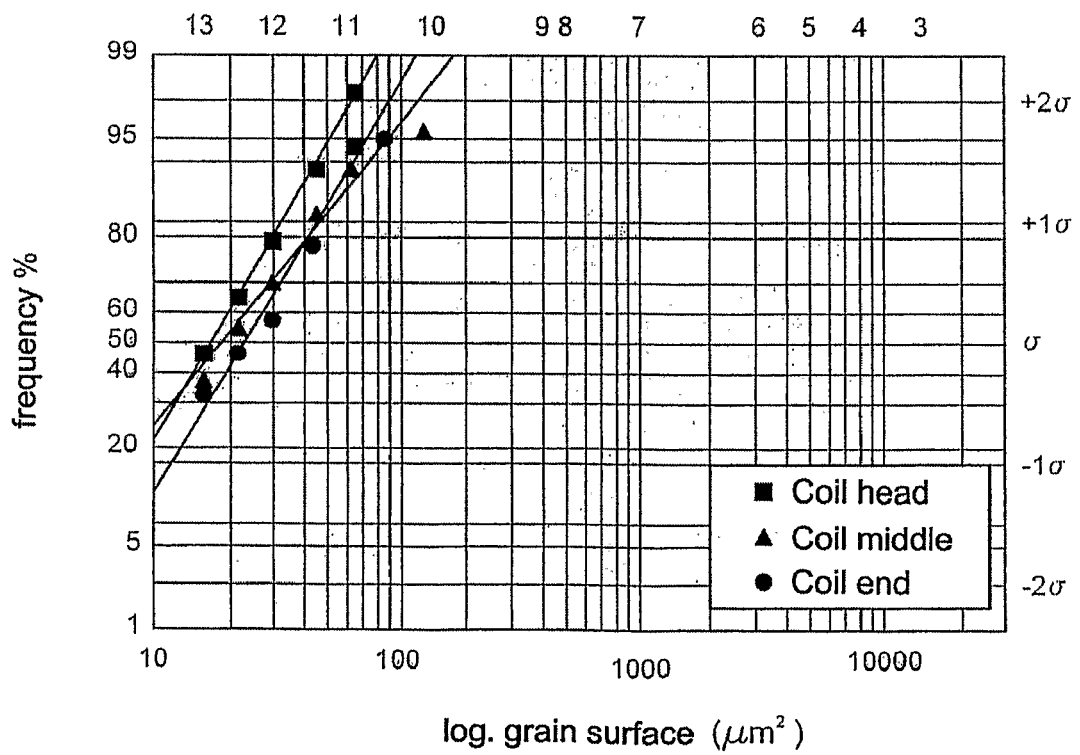
FIG. 2 shows a diagram of the graphs, plotted by points, of the frequency with which the presence of certain dimensions of the ferritic grain is statistically detected in a number of strip coils at the beginning, at the middle and the end, respectively, of each strip coil according to the invention.

Experimental tests have shown that the strips of the present invention are characterized by a fine grain structure better than grade 10 of the ASTM E 112 standard at a percentage higher than 90% in the whole structure, as it results from the graph of FIG. 2, clearly showing that the most grains, above all in the head region of the strip, has dimensions corresponding or lower (thereby a better fineness) than grade 10 of ASTM E 112 standard. These features of grain fineness and uniformity make this type of hot rolled strip particularly resistant to the fatigue tests. As it can be seen in FIG. 3, representing the experimental tests carried out in strips according to the invention, the strain resistance is higher than that of products obtained with conventional processes and comparable with that of cold rolled strips of the same grade. It will be noted that this occurs both in the range of the "end strain", namely for the limit values of load at which the breaking of the piece is experienced upon subjecting the same to a number N of cycle lower than $10^7$, and in the range of the "indefinite strain", namely the limit load determined by experimental tests, under which a piece does not break even if it is subjected to a number of strain cycles higher than the number conventionally adopted for the steel, i.e. $N=10^7$. In particular, the strain resistance detected for the S355MC steel at $N=10^7$ cycles (corresponding to 357 N/mm$^2$) was found better, with a margin of 5-10%, in correspondence with no-breaking probability of 50%. Furthermore, the ratio between the breaking point under strain due to plain flexure ($\sigma_{FP}$) and the yield point $\sigma_{FP}/R_{p0.2}$ is near to 1 and equal to 0.96, thereby constantly higher than that relating to the reference hot rolled material, comprised between 0.88 and 0.90, practically corresponding to the value of the same ratio as detected for cold rolled strips of the same grade.

The particular fine microstructure of these strips cause the same to be suitable for being finally cut and forming holes therein by punching, as well as the cold forming of complex shapes, in particular folds at 180° with bending radius equal to the thickness, for high strength steels having minimum warranted yield load comprised between 275 and 700N/mm$^2$. The cold forming of pieces having a complex shape is made easier also by the constant profile of the strip and its parallelism with deviation of less than 0.05 mm.

The various steel grades have a chemical analysis comprised within the limits listed in the following Table 1:

| Element | Content (%) |
|---|---|
| C | 0.04-0.08 |
| Mn | 0.15-2.0 |
| Si | 0.06-0.60 |
| P | 0.010 max |
| S | 0.010 max |
| Cr | 0.35 max |
| Ni | 0.20 max |
| Mo | 0.25 max |
| Cu | 0.20 max |
| Nb | 0.012-0.070 |
| V | 0.02-0.03 |
| Ti | ≦0.11 |
| Al | 0.025-0.050 |
| N | 0.0115 max |

As it can be deduced from the table above, the total sum of micro-alloying elements (V, Ti and Nb) does not exceed 0.2%.

The invention claimed is:

1. A hot rolled, micro-alloyed low carbon steel strip with micro-alloying elements comprising V, Ti and Nb,
   the steel strip having a thickness≧0.7 mm,
   the steel strip having a fine ferritic grain microstructure, wherein at least 95% of the grains in a head region of the strip have fineness greater than grade 11 of the ASTM E112 standard and at least 80% of the grains in a middle region of the strip have fineness greater than grade 11 of the ASTM E112 standard,
   wherein a ratio $\sigma_{FP}/R_{p0.2}$ between breaking load under strain due to plain flexure ($\sigma_{FP}$) and yield load ($R_{p0.2}$) is 90%,
   wherein a ratio between the yield load and breaking load is ≧70%,
   such metallurgical and geometrical features substantially corresponding to those of a cold rolled strip upon pickling and skinpassing, and
   wherein the sum of elements V, Ti and Nb does not exceed 0.2% wt.

2. A hot rolled, micro-alloyed low carbon steel strip with micro-alloying elements comprising V, Ti and Nb,
   the steel strip having a thickness≧0.7 mm,
   the steel strip having a fine ferritic grain microstructure, wherein at least 95% of the grains in a head region of the strip have fineness greater than grade 11 of the ASTM E112 standard and at least 80% of the grains in a middle and an end region of the strip have fineness greater than grade 11 of the ASTM E112 standard,
   wherein a ratio $\sigma_{FP}/R_{p0.2}$ between breaking load under strain due to plain flexure ($\sigma_{FP}$) and yield load ($R_{p0.2}$) is 90%,
   wherein a ratio between the yield load and breaking load is ≧70%,
   such metallurgical and geometrical features substantially corresponding to those of a cold rolled strip upon pickling and skinpassing, and
   wherein the sum of elements V, Ti and Nb does not exceed 0.2% wt.

3. The steel strip of claim 1 or 2, wherein thickness tolerances of the steel strip are 0.05 mm.

4. The steel strip of claim 1 or 2, comprising no additions of boron as micro-alloying element.

5. The steel strip of claim 1 or 2, the strip having a fatigue strength 5-10% higher when compared to the fatigue strength of prior hot rolled strips.

6. The steel strip of claim 1 or 2, the strip having a thickness≧0.7 mm and <2 mm.

* * * * *